United States Patent [19]

Ikeda et al.

[11] 4,074,279

[45] Feb. 14, 1978

[54] INK DROP WRITING APPARATUS

[75] Inventors: Takatoshi Ikeda; Yoshio Ohuchi, both of Ibaraki, Japan

[73] Assignee: Hitachi, Ltd., Japan

[21] Appl. No.: 723,609

[22] Filed: Sept. 15, 1976

[30] Foreign Application Priority Data

Sept. 19, 1975 Japan ................................ 50-112597

[51] Int. Cl.[2] ............................................ G01D 15/18

[52] U.S. Cl. ...................................................... 346/75

[58] Field of Search .......................................... 346/75

[56] References Cited

U.S. PATENT DOCUMENTS 3,947,853 3/1976 Denny et al. .......................... 346/75

OTHER PUBLICATIONS

Heard, R. S., Ink Jet Raster Height Control, IBM Tech. Disclosure Bull., April 1972, vol. 14, No. 11, pp. 3318–3319.

*Primary Examiner*—George H. Miller, Jr.
*Attorney, Agent, or Firm*—Craig & Antonelli

[57] ABSTRACT

In the case of writing information on a writing medium, such as the crown cap of a bottle, by the use of an ink drop writing apparatus, the information cannot be written at one selected position because the height of the writing medium varies with the height of the bottle and due to other factors. In emitting and deflecting charged ink drops to effect a writing on a writing medium whose position may vary somewhat, this invention detects the position of the writing medium in the deflecting direction of the charged ink drops with photoelectric means and increases or decreases the amount of deflection of the ink drops in accordance with the detected position of the writing medium. It is, accordingly, possible to write the desired information at precisely the correct position on the writing medium at all times.

10 Claims, 5 Drawing Figures

INK DROP WRITING APPARATUS

BACKGROUND OF THE INVENTION

This invention relates to apparatus for printing video signal information using ink drops, and more particularly, to an ink drop writing apparatus which is suitable for use in cases where the position of the writing medium varies in the deflecting direction of the charged ink drops.

It is already known to write on the crown cap of a bottle, etc., by means of an ink drop writing apparatus. In general, in the case of writing by use of an ink drop writing apparatus on the side surfaces of the crown caps of bottles as they are successively transported by a conveyor, the crown caps of the respective bottles may differ in their positional distance above the conveyor on account of the difference in the height of the various bottles, because of fluctuations in the height of the transport surface of the conveyor, etc. This inability to provide the writing medium at a precise location for each bottle leads to the disadvantage that the writing misses the smooth part of the side surface of the crown cap or misses the cap altogether in extreme cases.

SUMMARY OF THE INVENTION

It is accordingly an object of this invention to provide an ink drop writing apparatus which can direct the writing stream at the optimum position for writing on the writing medium at all times even when the position of the writing medium fluctuates in the deflecting direction of the writing beam.

A feature of this invention is that charged ink drops are emitted and deflected to write on a writing medium, and while the position of the writing medium in the deflecting direction is detected, the amount of deflection of each of the charged ink drops is increased or decreased in accordance with the detected position of the writing medium, thereby making corrections in the path of the writing stream to compensate for variation in the position of the writing medium.

DESCRIPTION OF THE PREFERRED EMBODIMENTS

Figure 1:
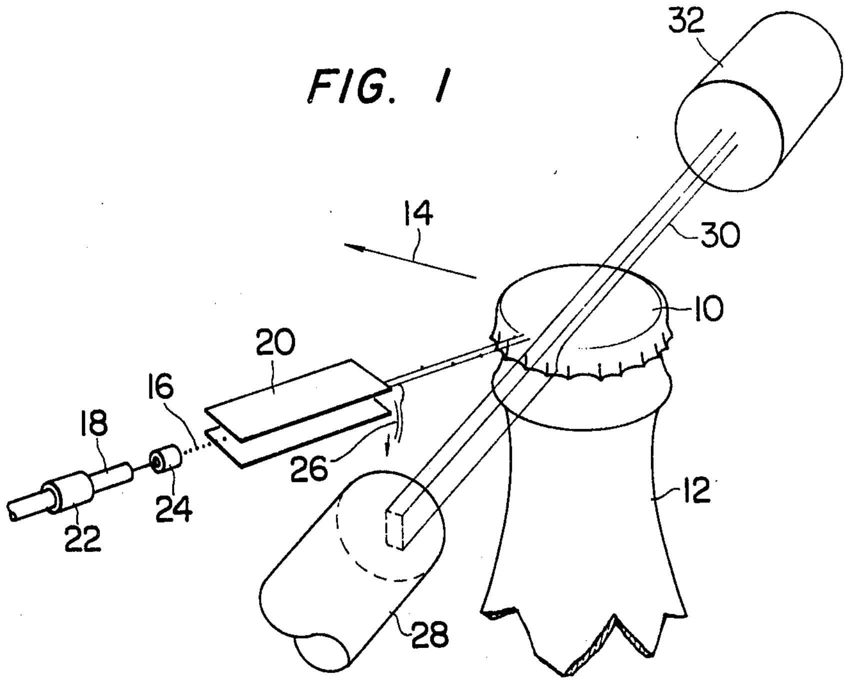
FIG. 1 is a perspective view of a portion of an ink drop writing apparatus and a position detecting apparatus in accordance with an embodiment of this invention.

FIG. 1 illustrates the mutual relation between a detecting arrangement for detecting the position of a crown cap of a bottle in the vertical direction and an ink jet recording device in the case of recording information on the side surface of the crown cap on the bottle.

In FIG. 1 the bottle 12 with the crown cap 10 is being translated, such as by a conveyor, in the direction of arrow 14, and charged ink drops 16 generated in the ink jet recording device are directed in a direction orthogonal thereto. The nozzle 18 and deflecting electrodes 20 are arranged so that the charged ink drops may be deflected in the vertical direction of the bottle by the constant electrostatic field generated between the deflecting electrodes depending on the charge thereof and may reach the side surface of the crown cap 10 to write selected information thereon.

A piezoelectric crystal 22 is connected to a high frequency power soure (not shown) so as to mechanically oscillate the nozzle 18 to convert an ink stream under pressure emitted thereby into a writing stream ink drops. The ink drops emitted from the nozzle 18 are charged in accordance with the amounts of deflection desired to reach a predetermined position on the writing medium while they pass through a charging electrode 24. The ink drops which are unnecessary for the writing operation are recovered by a waste catcher 26.

A collimated beam of light 30 is emergent from a light emitting member 28 of the position detector for the crown cap 10 in such a direction that a part thereof is intercepted by the crown cap 10 and the remaining part enters a light receiving portion 32.

Figure 2:
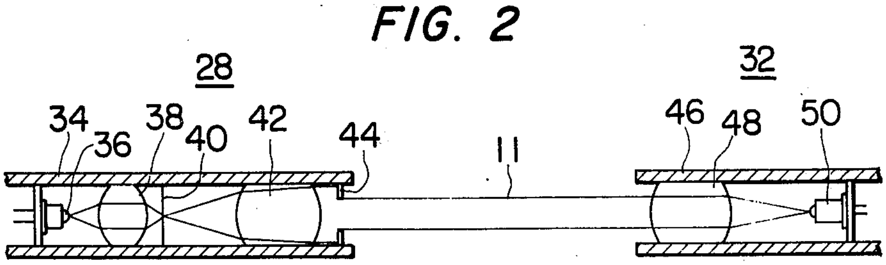
FIG. 2 is a view partly in section showing an embodiment of a position detecting apparatus in accordance with this invention.

The light emitting member 28 and the light receiving portion 32 are as shown in FIG. 2. The light emitting member 28 consists of a light emitting diode 36, a condenser lens 38, a pinhole diaphragm 40, a projection lens 42 and a window 44, which are disposed within a tubular holder 34. The light receiving portion 32 is composed of a light receiving lens 48 and a phototransistor 50, which are disposed within the holder 46.

Figure 3:
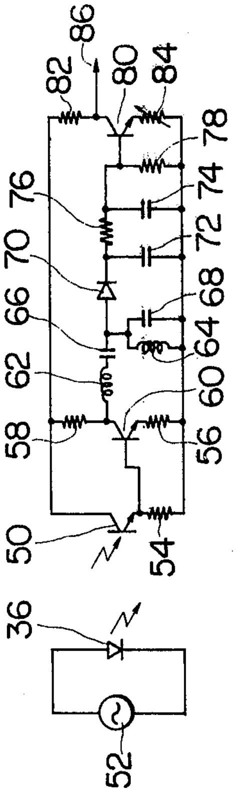
FIG. 3 is a schematic circuit diagram showing a circuit associated with the position detecting apparatus for detecting the position of the writing medium in the deflection direction of ink drops.

As illustrated in FIG. 3, the light emitting diode 36 is energized and lit up by an a.c. source 52. The output of the phototransistor 50, which receives illumination from the diode 36, is amplified by an amplifier circuit composed of resistances 54, 56, and 58 and a transistor 60. The amplified signal passes through a filter formed of inductances 62 and 64 and capacitors 66 and 68, and is thereafter smoothed by a diode 70, capacitors 72 and 74, and resistances 76 and 78. The resultant output is further amplified by a transistor 80, which is connected to resistances 82 and 84, and is delivered as output 86 from the collector of transistor 80. In the illustrated case, the detection output 86 becomes greater as more of the collimated light beam 30 is intercepted by the crown cap 10.

Figure 4:
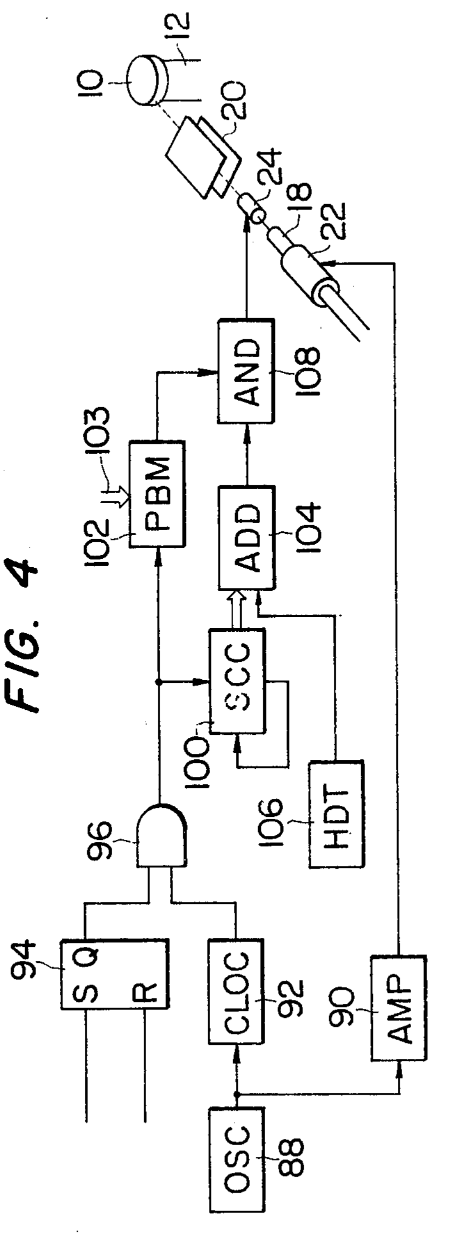
FIG. 4 is a schematic block diagram of the ink drop charging system including the control arrangement for deflection adjustment in accordance with this invention.

Referring to FIG. 4, the output of an oscillator circuit 88 is applied to the piezoelectric crystal 22 coupled to the nozzle 18 through an amplifier circuit 90 and is also converted into a clock signal by a clock circuit 92. The clock signal is fed to an AND gate 96 together with the output of a flip-flop 94, which controls and start and stop of the ink drop writing apparatus, Accordingly, the clock signal is fed to a scanning count circuit 100 and a pattern buffer memory 102 only when the ink drop writing apparatus carries out its writing operation.

The pattern buffer memory 102 stores therein the information 103 to be recorded, such as binary information as to presence or absence of a dot for each point of scanning, as is well known. The scanning count circuit 100 is reset and begins to count from zero again when it has counted a number of clock pulses equal to the number of recording dots in the scanning direction, and it outputs the count content during the count period in parallel in terms of binary codes to an adder circuit 104.

The adder circuit 104 receives the binary codes in parallel, weights them, and adds the weighted coded. Thus, it forms a stepped wave which has as many steps as the number of the recording dots in the scanning direction. Simultaneously therewith, the adder circuit 104 receives the output of a deflecting direction position-detecting circuit 106, i.e., the output 86 in FIG. 3, and adds it to the stepped wave. The stepped wave output and the signal from the pattern buffer memory 102 are analogically multiplied by means of an AND circuit 108. The product obtained is fed to the charging electrode 24.

Figure 5:
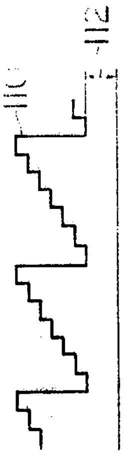
FIG. 5 is a diagram for explaining the operation of this invention.

With the construction described above, even when the height of the bottle fluctuates, it is possible to write at an appropriate position on the side surface of the crown cap 10 at all times. That is, in case of a bottle having a great height, the collimated light beam 30 in FIG. 1 is intercepted to a larger degree, and the output of the deflecting direction position-detecting circuit 106 becomes greater. Consequently, in the case where the output waveform of the adder circuit 104 is a deflecting voltage waveform 110, as shown in FIG. 5, the deflecting position base voltage 112 increases, and the recording moves upwards, so that the information can be written on the side surface of the crown cap. The amount of compensation of the position can be corrected by adjusting the gain the deflecting direction position-detecting circuit 106 (for example, by adjusting the resistance value of the resistance 84).

Although, in the foregoing embodiment, the detection of the position in the deflecting direction is conducted simultaneously with the writing, it is also possible to detect the position in the deflecting direction before the writing operation begins, to store the detected amount of the position and to determine the deflecting position from the stored amount at the time of writing.

While we have shown and described several embodiments in accordance with the present invention, it is understood that the same is not limited thereto but is susceptible of numerous changes and modifications as known to a person skilled in the art, and we therefore, do not wish to be limited to the details shown and described herein but intend to cover all such changes and modifications as are obvious to one of ordinary skill in the art.

What is claimed is:

1. In an ink drop writing apparatus for writing information on a writing medium by selectively deflecting a stream of charged ink drops into said writing medium, the improvement comprising detection means for detecting the position of the writing medium in the deflecting direction of the stream of charged ink drops, and deflection control means for increasing and decreasing the amount of deflection of said stream of charged ink drops in accordance with the position detected by said detection means, whereby the ink drops can be printed at predetermined positions on the writing medium even when the position of the writing medium varies in the deflecting direction.

2. The ink drop writing apparatus as defined in claim 1 wherein said detection means comprises a photoelectric device including light emitting means for directing a beam of light at said writing medium and light receiving means for detecting light receiving from said light emitting means.

3. The ink drop writing apparatus as defined in claim 2 wherein said light emitting means is positioned to direct a beam of light to a boundary of said writing medium and said light receiving means is positioned on the side of said writing medium opposite said light emitting means so as to receive light not intercepted by said writing means.

4. The ink drop writing apparatus as defined in claim 1 including nozzle means for generating a stream of ink drops along a predetermined path, a charging electrode disposed along said path for applying a charge to said drops, deflection means positioned along said path for generating an electrostatic field to deflect said charged drops, and means for generating a stepped voltage to charge successive drops to be directed to successive points on a scanning line on the writing medium, said deflection control means comprising adding means for adding said stepped voltage and the output of said detection means and means for applying the output of said adding means to said charging electrode.

5. The ink drop writing apparatus as defined in claim 4 wherein said nozzle means includes a nozzle for emitting an ink stream, an electromechanical transducer for vibrating said nozzle and a source of a.c. voltage connected to said transducer, said means for generating a stepped voltage comprising means responsive to said a.c. voltage for generating clock signals and scanning count circuit means responsive to said clock signals for generating said stepped voltage.

6. The ink drop writing apparatus as defined in claim 4 wherein said detection means comprises a photoelectric device including light emitting means for directing a beam of light at said writing medium and light receiving means for detecting light received from said light emitting means.

7. The ink drop writing apparatus as defined in claim 6 wherein said light emitting means is positioned to direct a beam of light to a boundary of said writing medium and said light receiving means is positioned on the side of said writing medium opposite said light emitting means so as to receive light not intercepted by said writing means.

8. The ink drop writing apparatus as defined in claim 7 wherein said light receiving means includes means for generating a deflection control signal whose magnitude varies with the amount of light received, said adding means adding said stepped voltage and said deflection control signal.

9. The ink drop writing apparatus as defined in claim 8 wherein said nozzle means includes a nozzle for emitting an ink stream, an electromechanical transducer for vibrating said nozzle and a source of a.c. voltage connected to said transducer, said means for generating a stepped voltage comprising means responsive to said a.c. voltage for generating clock signals and scanning count circuit means responsive to said clock signals for generating said stepped voltage.

10. The ink drop writing apparatus as defined in claim 9 wherein said means for applying the output of said adding means to said charging electrode comprises, pattern buffer memory means responsive to said clock signals for providing an information signal relating to a pattern to be written and an AND gate having one input receiving said information signal and a second input connected to the output of said adding means.

* * * * *